(12) United States Patent
Kuang

(10) Patent No.: US 9,699,373 B2
(45) Date of Patent: Jul. 4, 2017

(54) PROVIDING NAVIGATION INFORMATION TO A POINT OF INTEREST ON REAL-TIME STREET VIEWS USING A MOBILE DEVICE

(71) Applicant: TENCENT TECHNOLOGY (SHENZHEN) COMPANY LIMITED, Shenzhen, Guangdong (CN)

(72) Inventor: Junbin Kuang, Shenzhen (CN)

(73) Assignee: TENCNT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 13/989,735

(22) PCT Filed: Apr. 28, 2013

(86) PCT No.: PCT/CN2013/075009
§ 371 (c)(1),
(2) Date: May 24, 2013

(87) PCT Pub. No.: WO2014/176745
PCT Pub. Date: Nov. 6, 2014

(65) Prior Publication Data
US 2014/0320674 A1 Oct. 30, 2014

(51) Int. Cl.
*H04N 5/225* (2006.01)
*H04N 5/232* (2006.01)
*H04N 1/32* (2006.01)

(52) U.S. Cl.
CPC ..... *H04N 5/23222* (2013.01); *H04N 1/32144* (2013.01); *H04N 5/23293* (2013.01);
(Continued)

(58) Field of Classification Search
CPC .................................................. H04N 5/23293
(Continued)

(56) References Cited

U.S. PATENT DOCUMENTS 6,073,075 A * 6/2000 Kondou et al. ............... 701/516
6,222,583 B1 * 4/2001 Matsumura et al. .......... 348/113
(Continued)

FOREIGN PATENT DOCUMENTS

CN 101118162 A 2/2008
CN 102037483 A 4/2011
(Continued)

OTHER PUBLICATIONS

Tencent Tech, ISR, PCT/CN2013/075009, Feb. 13, 2014, 3 pgs.
Tencent Technology, IPRP, PCT/CN2013/075009, Nov. 3, 2015, 8 pgs.

*Primary Examiner* — Anthony J Daniels
(74) *Attorney, Agent, or Firm* — Morgan, Lewis & Bockius LLP

(57) ABSTRACT

Method of and systems for providing point of interest (POI) information on a mobile device is described. The method of providing point of interest (POI) information on a mobile device including a non-transitory computer readable medium including a program, a processor, and a computer executable program code includes: initiating capture of a real-time image by a camera module of a mobile device; determining location information of the mobile device; sending the location information to a server; receiving POI information from the server, wherein the POI information relates to at least one object near the mobile device and currently appearing in the real-time image; and displaying the POI information, superimposed on the real-time image, on the mobile device.

8 Claims, 6 Drawing Sheets

(52) U.S. Cl.
CPC ............... *H04N 2201/3245* (2013.01); *H04N 2201/3253* (2013.01)

(58) Field of Classification Search
USPC .................................................. 348/113, 119
See application file for complete search history.

(56) References Cited

U.S. PATENT DOCUMENTS

| | | | |
|---|---|---|---|
| 8,264,584 B2* | 9/2012 | Mukai et al. | 348/333.02 |
| 8,326,524 B2* | 12/2012 | Harada | 701/409 |
| 2006/0155466 A1 | 7/2006 | Kanda et al. | |
| 2006/0195858 A1* | 8/2006 | Takahashi et al. | 725/19 |
| 2008/0139245 A1* | 6/2008 | Huh | G06Q 10/109 455/556.2 |
| 2013/0076917 A1* | 3/2013 | Hill | 348/207.1 |
| 2014/0067937 A1* | 3/2014 | Bosworth et al. | 709/204 |
| 2014/0191886 A1* | 7/2014 | Barrett | 340/989 |

FOREIGN PATENT DOCUMENTS

| | | |
|---|---|---|
| CN | 102121831 A | 7/2011 |
| CN | 102338639 | 2/2012 |
| CN | 102338639 A | 2/2012 |
| CN | 102519478 | 6/2012 |
| CN | 102706355 A | 10/2012 |
| CN | 102759360 A | 10/2012 |
| CN | 102879000 A | 1/2013 |
| CN | 102889892 A | 1/2013 |
| TW | 200848703 A | 12/2008 |
| TW | 201033586 A | 9/2010 |
| TW | 201104227 A | 2/2011 |
| WO | WO 2008035277 A2 | 3/2008 |

\* cited by examiner

PROVIDING NAVIGATION INFORMATION TO A POINT OF INTEREST ON REAL-TIME STREET VIEWS USING A MOBILE DEVICE

CROSS REFERENCE TO RELATED APPLICATION

This Application is a United States National Stage Application filed under 35 U.S.C. §371 of PCT patent application Ser. No. PCT/CN2013/075009 filed on Apr. 28, 2013, the contents of which are hereby incorporated in their entirety.

TECHNICAL FIELD

The present invention relates to determining and superimposing labels on real-time street views captured by a mobile device, and more particularly, to a system, method, and computer-implemented program for providing navigation information to a destination, e.g., a point of interest (POI), and superimposing such information on real-time street views captured by a camera in a mobile device based on real-time location data of the mobile device.

BACKGROUND

The ubiquitous presence of cell phones in our society is almost universal. It is estimated that there are as many as 6 billion cell phone subscribers on the planet with a population of about 7 billion people at this time. Approximately 1 billion of those cell phones are smartphones, and that number is projected to double by 2015. The technological advances found in smartphones continue to become standard features e.g., cameras, Bluetooth, GPS, touch screens, and WiFi are now commonplace in smartphones. While the functionality of smartphones increase, the costs of purchasing such a mobile device continue to decrease. Similarly, other mobile devices including tablets and laptops have shown ever increasing functionality at lower cost.

Many smartphones are able to obtain location information from, for example, GPS (global positioning satellite) receivers, triangulation based on wireless carrier transmitter locations, or an IP (Internet protocol) address information of a WiFi network to which the smartphone is connected. In addition, many smartphones have internal sensors which determine the orientation of the smartphone, e.g., an accelerometer, a magnetometer, and a gyroscope. Current map programs track a user's location a pre-stored map image and include labels, e.g., for points of interest (POIs), on the large-scale map or on a pre-labeled static image retrieved from a server that may include buildings selected by the user for more information.

However, the conventional map labels do not provide real-time information on the actual surroundings of the user. The user must correlate the downloaded labeled images to his surroundings and visible landscape, which may have changed since the street level image was taken. If a new building was erected or an old building demolished, the user may not recognize his surroundings based on the received static image. If the POIs have changed, the received static image may have updated labels on an outdated image.

As such, there is a need for a system that provides real-time information on visible surroundings to a user by superimposing point of interest (POI) information on the images displayed on the mobile device.

SUMMARY

Embodiments of the present application relate to providing point of interest (POI) information on a mobile device.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the implementations, as embodied and broadly described herein, there is provided a method of providing point of interest (POI) information on a mobile device including a non-transitory computer readable medium including a program, a processor, and a computer executable program code includes: initiating capture of a real-time image by a camera module of a mobile device; determining location information of the mobile device; sending the location information to a server; receiving POI information from the server, wherein the POI information relates to at least one object near the mobile device and currently appearing in the real-time image; and displaying the POI information, superimposed on the real-time image, on the mobile device.

In another aspect, there is provided a method of providing point of interest (POI) information from a server to a mobile device including a non-transitory computer readable medium including a program, a processor, and a computer executable program code, the method including: initiating capture of a real-time image by a camera module of a mobile device; receiving user-provided destination information; determining location information of the mobile device; sending the location information and the destination to a server; receiving POI information from the server, wherein the POI information includes label information associated with at least one object near the mobile device and navigation information from the location of the mobile device to the destination; and displaying the POI information, superimposed on the real-time image, on the mobile device.

In another aspect, there is provided a mobile device for providing point of interest (POI) information, the mobile device including: a processor, a plurality of sensors, and memory for storing programs to be executed by the processor, the programs including instructions for: initiating capture of a real-time image by a camera module of the mobile device; determining location information of the mobile device using at least one of the sensors; sending the location information to a server; receiving POI information from the server, wherein the POI information relates to at least one object near the mobile device and currently appearing in the real-time image; and displaying the POI information, superimposed on the real-time image, on the mobile device.

In another aspect, there is provided a method for providing navigation information to a mobile device at a server having a processor and memory for storing programs to be executed by the processor, the method including: receiving location information and destination information from the mobile device; identifying POI information in accordance with the location information and the destination information, wherein the POI information includes label information associated with at least one object near the mobile device and navigation information from the location of the mobile device to the destination; and returning the POI information to be superimposed on a real-time image captured by a camera of the mobile device.

In another aspect, there is provided a server for providing navigation information to a mobile device, the server having a processor and memory for storing programs to be executed by the processor, the programs including instructions for: receiving location information and destination information from the mobile device; identifying POI information in accordance with the location information and the destination information, wherein the POI information includes label information associated with at least one object near the mobile device and navigation information from the location of the mobile device to the destination; and returning the POI information to be superimposed on a real-time image captured by a camera of the mobile device.

It is to be understood that both the foregoing general description and the following detailed description are examples and explanatory and are intended to provide further explanation of implementations of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
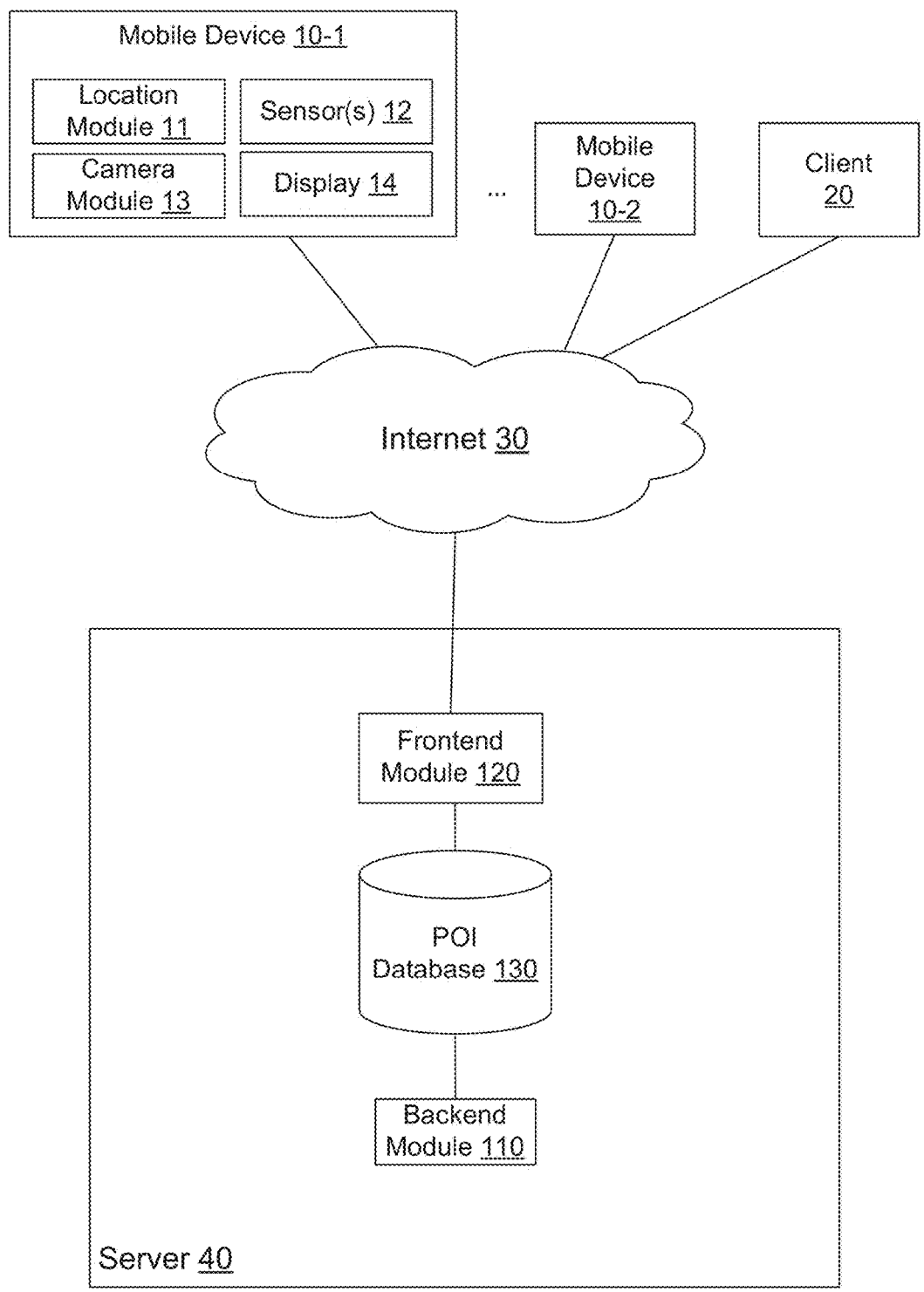
FIG. 1 is a block diagram illustrating a distributed network environment including a client's mobile device, the Internet, and a remote server in accordance with some implementations.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to implementations of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

FIG. 1 is a block diagram illustrating a distributed network environment including a system for providing real-time image information to a prospective user according to an example implementation of the present invention. "Real-time" as used herein refers to substantially without perceivable delay to a user.

As shown in FIG. 1, a distributed network environment may include clients 20 (some of which being identified as mobile devices 10-1 and 10-2), the Internet 30, and a server 40 for providing point of interest (POI) information in response to a client request in accordance with some implementations. Depending on the context, a client in the present application may refer to an electronic device, e.g., a desktop, laptop, tablet, or smartphone, etc., through which a user can access the Internet. The clients 20 may be, e.g., users of the present application, external content providers, or third-party content providers.

As shown in FIG. 1, a mobile device 10-1 may include four different modules, e.g., a location module 11, one or more orientation sensors 12, a camera module 13, and a display 14. The location module 11, e.g., a global positioning satellite (GPS) receiver, may determine a geographic location as related to a two-dimensional map. In some implementations, the location module 11 may determine the geographic location based on the position of one or more mobile service providers, e.g., cell towers, to which the mobile device 10-1 has access. In some implementations, a general location of the mobile device 10-1 may be determined first based on the mobile service provider, then a more specific location may be determined as GPS information is received by the location module 11. The one or more orientation sensors 12 may determine the orientation of the mobile device and presumably a user holding the device. The orientation sensor(s) may include, for example, an accelerometer, a magnetometer, and a gyroscope. It should be understood that other sensors 12 may be included in the mobile device 10-1 which may be used in implementations to determine the orientation and/or location of the mobile device 10-1.

The mobile device 10-1 may include the camera module 13, which may capture an image 460, 560 (see the examples in FIGS. 4-5) that is displayed on the display 14. In some implementations, the image 460, 560 may be a real-time image that shows on the display 14 as the mobile device 10-1 is moved, without having to focus such that the image would be typically stored into a memory (not shown), as in an internal memory of the mobile device 10-1 or a removable storage device, e.g., a nonvolatile memory, such as a flash memory. This may allow images closer to real-time to be provided with the POI information. In alternative implementations, the image may be so stored.

The server 40 may include a frontend module 120, a backend module 110, and a POI information database 130. These will be described in more detail with reference to FIG. 2A.

Figure 2A:
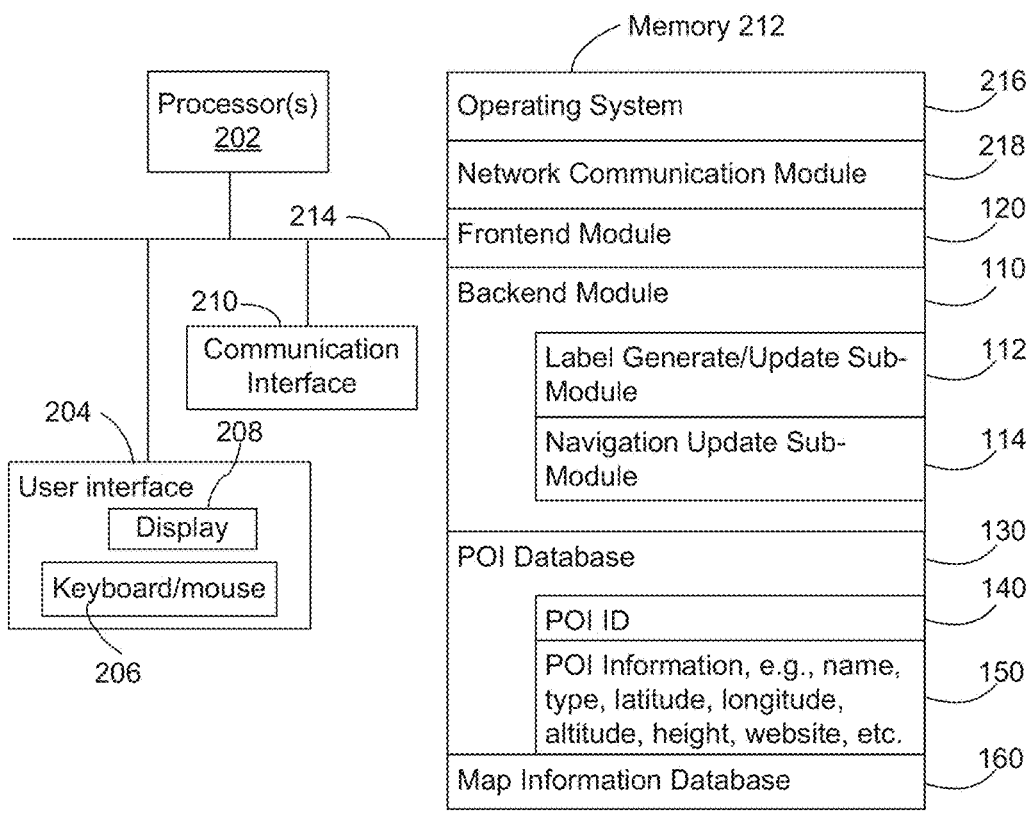
FIG. 2A is a block diagram illustrating different components of the remote server that are configured for communicating with the mobile device in accordance with some implementations.

FIG. 2A is a block diagram illustrating different components of the server 40 of FIG. 1 that may be configured for receiving data, e.g., the location information, from the location module 11 of the mobile device 10-1 to the server system 40 in response to a user's activating the mobile device 10-1 to send the location information. The server 40 may include one or more processors 202 for executing modules, programs and/or instructions stored in a memory 212 and performing predefined operations; one or more network or other communications interfaces 210; the memory 212; and one or more communication buses 214 for interconnecting these components. In some implementations, the server 40 may include a user interface 204 including a display device 208 and one or more input devices 206 (e.g., a keyboard and/or a mouse).

In some implementations, the memory 212 may include a high-speed random access memory, such as DRAM, SRAM, or other random access solid state memory devices. In some implementations, the memory 212 may include a non-volatile memory, such as one or more magnetic disk storage devices, optical disk storage devices, flash memory devices, or other non-volatile solid state storage devices. In some implementations, memory 212 includes one or more storage devices remotely located from the processor(s) 202. The memory 212, or alternately one or more storage devices (e.g., one or more nonvolatile storage devices) within the memory 212, may include a non-transitory computer readable storage medium. In some implementations, the memory 212 or the computer readable storage medium of the memory 212 may store the following programs, modules and data structures, or a subset thereof:

- an operating system 216 that may include procedures for handling various basic system services and for performing hardware dependent tasks;
- a network communications module 218 that may be used for connecting to the mobile device 10-1, as well as for connecting the mobile device 10-1 to other computers (e.g., the client 20 in FIG. 1) via the communication network interfaces 210 and one or more communication networks (wired or wireless), such as the Internet 30 in FIG. 1, other wide area networks, local area networks, metropolitan area networks, etc.;
- a frontend module 120 for receiving a request or query from the mobile device 10-1 for information related to a POI (e.g., identity information and navigation information), obtaining the POI-related information from a POI information database 130, and returning the POI-related information, e.g., the buildings and/or streets in the area surrounding the mobile device 10-1 (which may or may not be captured by the camera of the mobile device 10-1 yet) to the requesting mobile device 10-1;
- a backend module 110 for processing the request forwarded by the frontend module 120 and querying the POI database for POI-related information and the map information database 160 for determining a navigation path from the current location of the mobile device 10-1 to a destination specified by a user of the mobile device 10-1; in some implementations, the backend module 110 further includes a label generate/update sub-module 112 for determining labels of POIs near the mobile device 10-1 and generate/update their current locations on the street views captured by the mobile device 10-1 based on the real-time geographical/spatial data generated by different sensors in the mobile device 10-1; and a navigation update sub-module 114 for generating/updating the navigation information to be displayed on the street views captured by the mobile device 10;
- a POI information database 130 including a plurality of entries, each entry including a unique POI ID 140 and associated data 150 such as the name and type of the POI, the geographical data including latitude, longitude, altitude, and height of the POI, etc.; in some implementations, the POI information includes a website (e.g., www.goldengatebridge.org for the Golden Gate Bridge at San Francisco Bay); and
- a map information database 160 that includes a 2D street map of a geographical region from which the backend module 110 can determine a navigation path from the current location of the mobile device 10-1 and a destination provided by the mobile device 10-1.

The POI ID 140 may include, for example, GPS coordinates for each POI in the POI information database 130, groupings of POIs, e.g., by general location or area, road names, intersection identifications, an identity of another mobile device 10-2, or other identification for POIs for which information will be returned to the mobile device 10-1. The POI ID 140 may also include identification of advertising, which may be relevant to the user-provided destination, surrounding area, or a current location of the mobile device 10-1.

The associated data 150 may include more detailed information, which may include, for example, names and/or labels associated with the POIs, more detailed GPS data for POIs, legal turns at intersections/roads/roadway exits which may themselves be POIs or which may be located near one or more POIs or near the location of the mobile device 10-1, navigation information, and/or information about another mobile device 10-2. The associated data 150 may also include advertising content, for example, advertising images or URLs to find additional content, e.g., in a browser. The associated data 150 may further include a name of a person or group associated with the other mobile device 10-2.

It should be noted that the modules, databases, and systems in the server 40 described above in connection with FIG. 2 may be implemented on a single computer server or distributed among multiple computer servers that are connected by a computer network. Although a specific hardware configuration may affect the performance of the mobile device 10-1, implementations of the present application do not have any dependency on a particular hardware configuration.

Figure 2B:
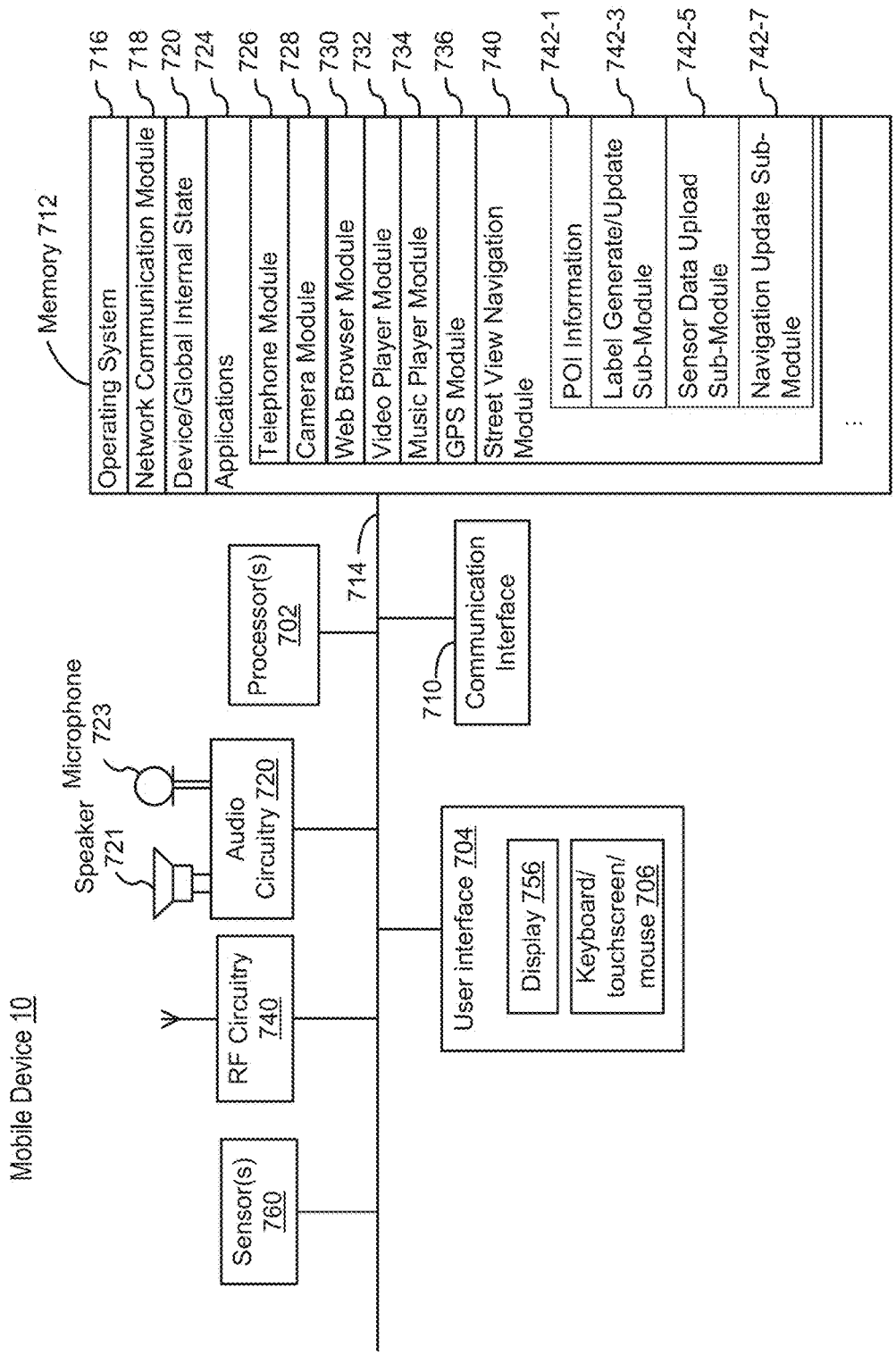
FIG. 2B is a block diagram illustrating different components of the mobile device that are configured for providing navigation information on real-time street views to its user in accordance with some implementations.

FIG. 2B is a block diagram illustrating different components of the mobile device 10 that may be configured for providing navigation information to its user. The mobile device 10 includes one or more processors 702 for executing modules, programs and/or instructions stored in memory 712 and thereby performing predefined operations; audio circuitry 720 including speaker 721 and microphone 723, RF (radio frequency) circuitry 740; one or more sensors 760; one or more network or other communications interfaces 710; memory 712; and one or more communication buses 714 for interconnecting these components. In some implementations, the mobile device 10 includes a user interface 704 comprising a display device 756 and one or more input devices 706 (e.g., keyboard, touchscreen, or mouse).

Audio circuitry 720 receives electrical signals converted by microphone 723 from the sound waves emanating from the electronic device. Audio circuitry 720 also may receive audio data from the communication buses 714, and convert the audio data to an electrical signal, and transmit the electrical signal to speaker 721. The speaker 721 may convert the electrical signal to human-audible sound wave. Audio circuitry 720 converts the electrical signal to audio data and transmits the audio data to the processors 702 for processing.

RF circuitry 740 converts electrical signals to/from electromagnetic signals and communicates with communications networks and other communications devices via the electromagnetic signals. RF circuitry 740 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 740 may communicate with networks, such as the Internet, an intranet and/or a wireless network, such as a cellular telephone network, a wireless local area network (WLAN) and/or a metropolitan area network (MAN), and other devices by wireless communication.

The sensors 760 in the mobile device 10 may include one or more proximity sensors for turning off and disabling the touch-sensitive display 756 when the mobile device 10 is placed near the user's ear (e.g., when the user is making a phone call). The mobile device 10 may also include one or more accelerometers for detecting the movement of the mobile device 10, a magnetometer (also known as "digital compass") for determining the orientation of the mobile device 10, a gyroscopic sensor for determining the rotation and inclination angles of the mobile device 10, a GPS receiver for obtaining the geographical location information of the mobile device 10, and one or more image sensors for capturing still images or video streams. As will be described in more detail below, data from one or more of these sensors are provided to the remote server 40 for determining and displaying information about objects captured by the camera of the mobile device, including labeling the objects and superimposing navigation information to a POI from the current location of the mobile device 10.

In some implementations, the memory 712 includes high-speed random access memory, such as DRAM, SRAM, or other random access solid state memory devices. In some implementations, memory 712 includes non-volatile memory, such as one or more magnetic disk storage devices, optical disk storage devices, flash memory devices, or other non-volatile solid state storage devices. In some implementations, memory 712 includes one or more storage devices remotely located from the processor(s) 702. Memory 712, or alternately one or more storage devices (e.g., one or more nonvolatile storage devices) within memory 712, includes a non-transitory computer readable storage medium. In some implementations, memory 712 or the computer readable storage medium of memory 712 stores the following programs, modules and data structures, or a subset thereof:

- an operating system 716 that includes procedures for handling various basic system services and for performing hardware dependent tasks;
- a network communications module 718 that is used for connecting the mobile device 10 to other computers (e.g., the remote server 40 in FIG. 1) via the communication network interface 710 and one or more communication networks (wired or wireless), such as the Internet 30 in FIG. 1, other wide area networks, local area networks, metropolitan area networks, etc.; and
- device/global internal state 720 including one or more of: active application state, indicating which applications, if any, are currently active; display state, indicating what applications, views or other information occupy various regions of the display of the mobile device; and sensor state, including information obtained from the mobile device's various sensors 760.

Applications 724 stored in the memory 712 may include the following modules (or sets of instructions), or a subset or superset thereof: telephone module 726, camera module 728, web browser module 730, video player module 732, music player module 734, GPS module 736, and street view navigation module 740. The street view navigation module 740 may include: destination information 742-1, e.g., POI information; a label generate/update sub-module 742-3 for receiving information of POIs near the mobile device 10 from the remote server 40 and generate/update labels for the POIs on the street views captured by the image sensor of the mobile device 10; a sensor data upload sub-module 742-5 for uploading the real-time data generated by different sensors 760 to the remote server 40 for determining the navigation and/or label information of POIs near the mobile device 10; and a navigation update sub-module 742-7 for updating the navigation information displayed on the street views captured by the image sensor of the mobile device 10. Note that the updated navigation information may be generated by the mobile device 10, the remote sever 40, or cooperation between the mobile device 10 and the remote server 40.

When a user visits a city for the first time, he may get lost if there is no clear street sign indicating where he is and which direction he should take to get to his destination. As will be described below, there are multiple ways that the service according to the present invention helps the user navigate through this unfamiliar environment by providing information through a real-time street view captured by the user's mobile device (e.g., a smartphone). First, when the user points the camera in the mobile device at a building in front of him, a real-time street view is generated on the screen of the mobile device. By superimposing/overlaying a label on top of the building in the screen, the label showing the name of a company occupying the building, it makes it easier for the user to determine his exact location by, e.g., looking for the name on a paper or electronic map. If the user is on his way to a destination, the labels displayed on the nearby buildings are also good indicators which direction the user should take to get to the destination. Second, by having the user's current location and his destination, it is possible for the mobile device 10 or the remote server 40 to determine a navigation path from the user's current location to the destination and then display the navigation path on the real-time street view so that the user can follow the instructions on the real-time street view to arrive at the destination. Compared with a 2-D navigation system (which provides a bird view of the navigation path) or a virtual 3-D navigation system (which synthesizes a perspective 3-D view of objects in front of the user), the navigation system built on top of the real-time street view can provide the most intuitive information for the user to navigate through an unknown area (e.g., the downtown of a metropolitan where there are a lot of similar buildings but lack of famous landmarks for the user to rely upon).

Figure 3:
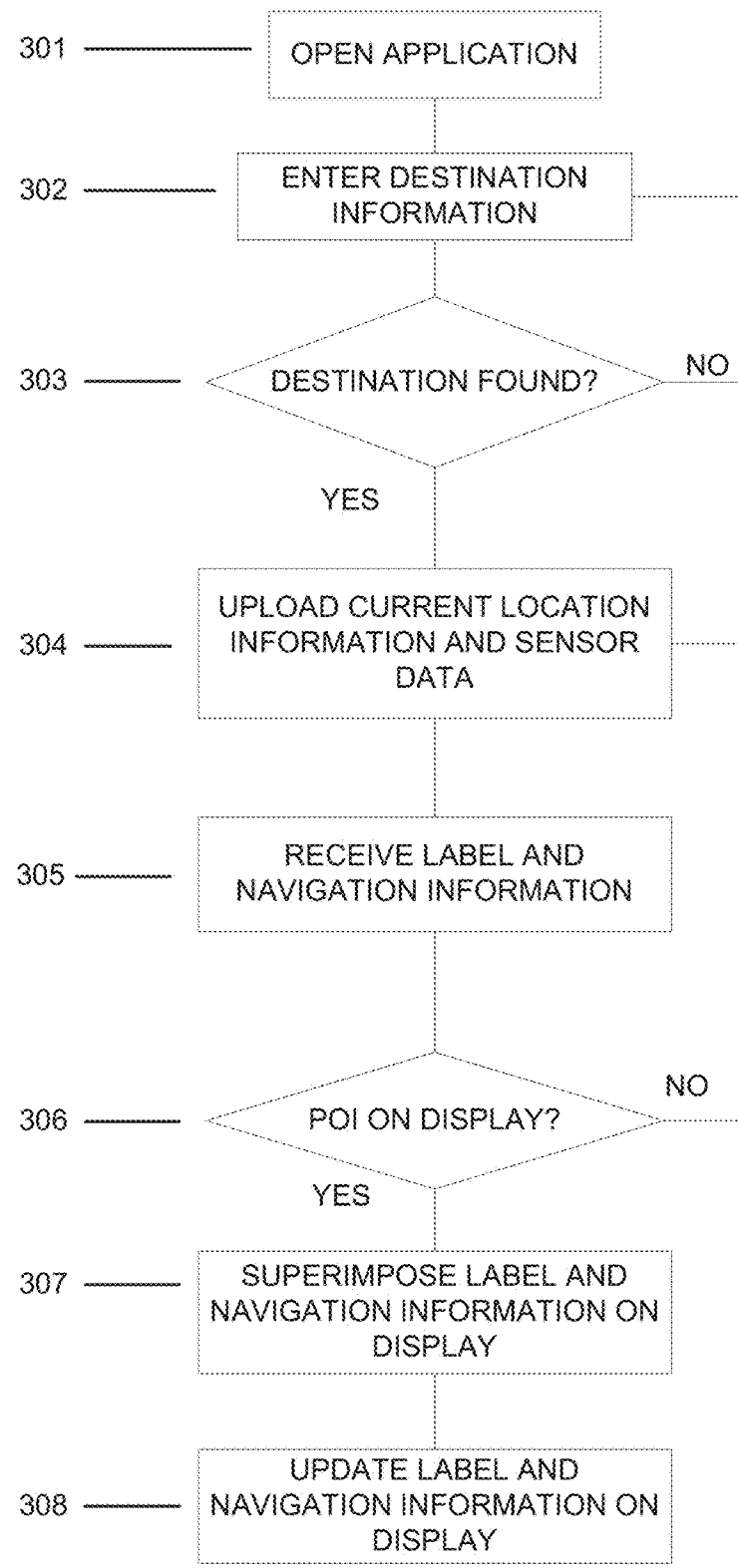
FIG. 3 is a flow chart illustrating a method for implementing an interactive interface according to an exemplary implementation of the present invention.

FIG. 3 is a flow chart illustrating a method of providing an interactive interface according to an example implementation of the present invention.

At operation 301, the user may open an application (e.g., the street view navigation module 740 in FIG. 2B) on the mobile device. The application may be used by the user as a virtual navigation, real-time display of street view images obtained by, e.g., the camera module 13 of the mobile device 10-1. In some implementations, the user may press an icon on a smartphone's touch screen to open the application. This may cause the camera module 13 (FIG. 1) to be initiated to begin the camera's processing and displaying images on the display 14 (FIG. 1). Alternatively, the user may separately initiate the camera module 10-1 (FIG. 1), either before launching the application or after the application is open.

At operation 302, the user may enter a navigation command including a destination, e.g., by text or by voice. In this example, it is assumed that the user-provided destination is the name of a POI. The POI information may be transmitted to a streetscape navigation backend server, e.g., the remote server 40 of FIG. 1. The remote server 40 then looks into the POI information database 130, within a certain range around the user's current location (for example, 500 m) to search for the destination name. If the POI information is found at the "YES" branch of operation 303, the remote server 40 may notify the mobile device to provide more information about its current location and orientation and movement in order to provide label and navigation information back to the mobile device 10-1. At the "NO" branch of operation 303, the mobile device then prompts the user to re-enter the location information of the destination, for example, if no POI information is found. In some implementations, if no POI information is found, the server 40 may communicate with an external or third-party application (e.g., a map service provider) and solicits POI information near the mobile device and return the POI information to the mobile device for the user to choose from.

At operation 304, after starting the navigation, the mobile device 10-1 may send updated location information and data captured by its sensors, for example at a predetermined time interval, which may be continually uploaded to the server 40. In some implementations, the location information and sensor data include the current latitude, longitude, and altitude of the mobile device determined by the GPS module. Such information is used for determining the mobile device's location on a 2D map, which serves as the starting point for calculating the navigation path to the destination. The location information and sensor data may also include the output from the magnetometer in the mobile device, which is used for determining the mobile device's orientation. As will be described below, the orientation information helps determine what object(s) is visible in the real-time street view captured by the mobile device's camera and then their associated label information. In some implementations, the mobile device also uploads the output from the 3-axis accelerometer and the gyroscope in the mobile device. For example, the output from the 3-axis accelerometer, alone or in combination with the GPS signals, can be used for determining the horizontal moving speed of the mobile device with respect to the surrounding environment, which is then used for determining the "horizontal moving speed" of a label associated with an object, e.g., a building, appearing on the real-time street view. Using such information, the remote server 40 or the mobile device 10 can then update the location of the label on the real-time street view periodically to achieve the effect that the label is "stuck" on the building and there is no relative movement between the label and the building in the image. Similarly, the output from the gyroscope is also used for determining the location of the label on the building in the real-time street view such that, when the rotation or inclination angle of the mobile device changes, the label's location on the street view should be moved accordingly to achieve the same effect that the label is "stuck" on the building and there is no relative movement between the label and the building in the image. Note that there are multiple ways of splitting the label location calculation between the remote server 40 and the mobile device 10, which determines what sensor data needs to be uploaded from the mobile device to the server 40. For illustrative purposes, the example below assumes that the remote server determines the label location of the objects in the street view. But one skilled in the art would understand that other approaches (e.g., having the mobile client determine the label location) is within the disclosure scope of the present application.

The server 40 may send back POI information to the mobile device 10-1 based on the GPS coordinates of the user. As noted above, the information sent to the server 40 may also include other sensor data from the mobile device 10-1, e.g., direction of travel, acceleration, inclination data. This data, combined with a library of two-dimensional map information, may provide the user the most appropriate navigation information.

Figure 4:
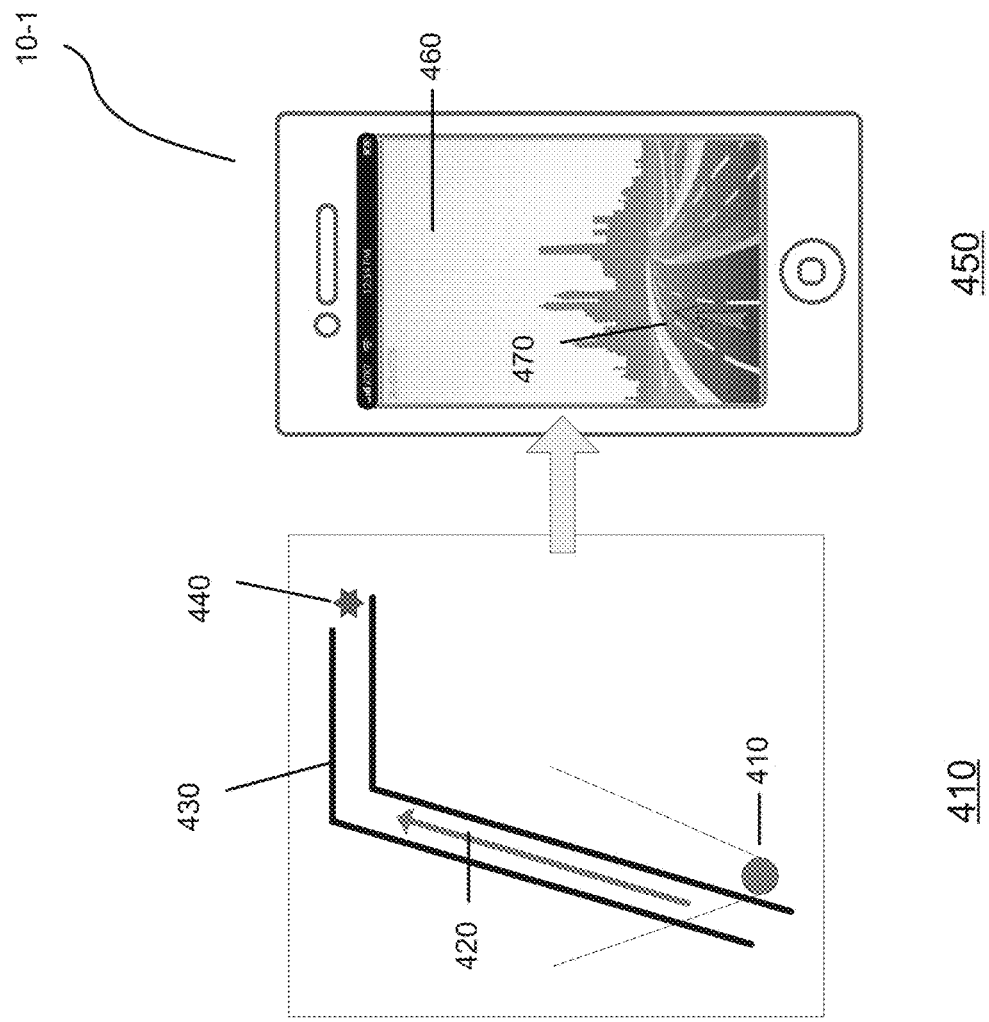
FIG. 4 is a screen shot of a two-dimensional map corresponding to an image having navigation information superimposed thereon in accordance with some implementations.

The mobile device 10-1 may send location information from the location module 11, e.g., GPS location information, to the server 40 which may then to determine the location of the user, and this may be mapped to the two-dimensional map information, for example, according to the user coordinate, which may indicate the user's location on a road. The location information may be real-time location information on the current location of the mobile device 10-1. In some implementations, the two-dimensional map information may be shown on the display 14, either alone or with a real-time image, e.g., with a split screen our picture-in-picture view. In some implementations, the two-dimensional map information is not displayed to the user. The left side of FIG. 4 shows the two-dimensional map information 410, which may be similar to that shown in conventional GPS devices and applications. In the FIG. 4 example, the user indicator 410 is shown near (or on) the road 430. An arrow 420 indicates a direction in which a user may travel to reach the user-selected destination at the destination indicator 440, which is shown along the road 430.

The mobile device 10-1 may use its sensors, e.g., a magnetoresistive (magnetometer) sensor, to send direction of travel information to the server 40 to determine the orientation of the user, and this may be mapped to the two-dimensional map information. The server 40 may then determine an expected destination with respect to the orientation of the user's current location. Combined with the actual orientation, the user may determine in which direction to travel to reach a desired destination. At operation 305, the mobile device receives the label and navigation information determined by the remote server. The label information includes labels to be superimposed on the real-time street view based on the sensor data provided by the mobile device. In particular, the label information may include the label of the destination if it exists.

Figure 5:
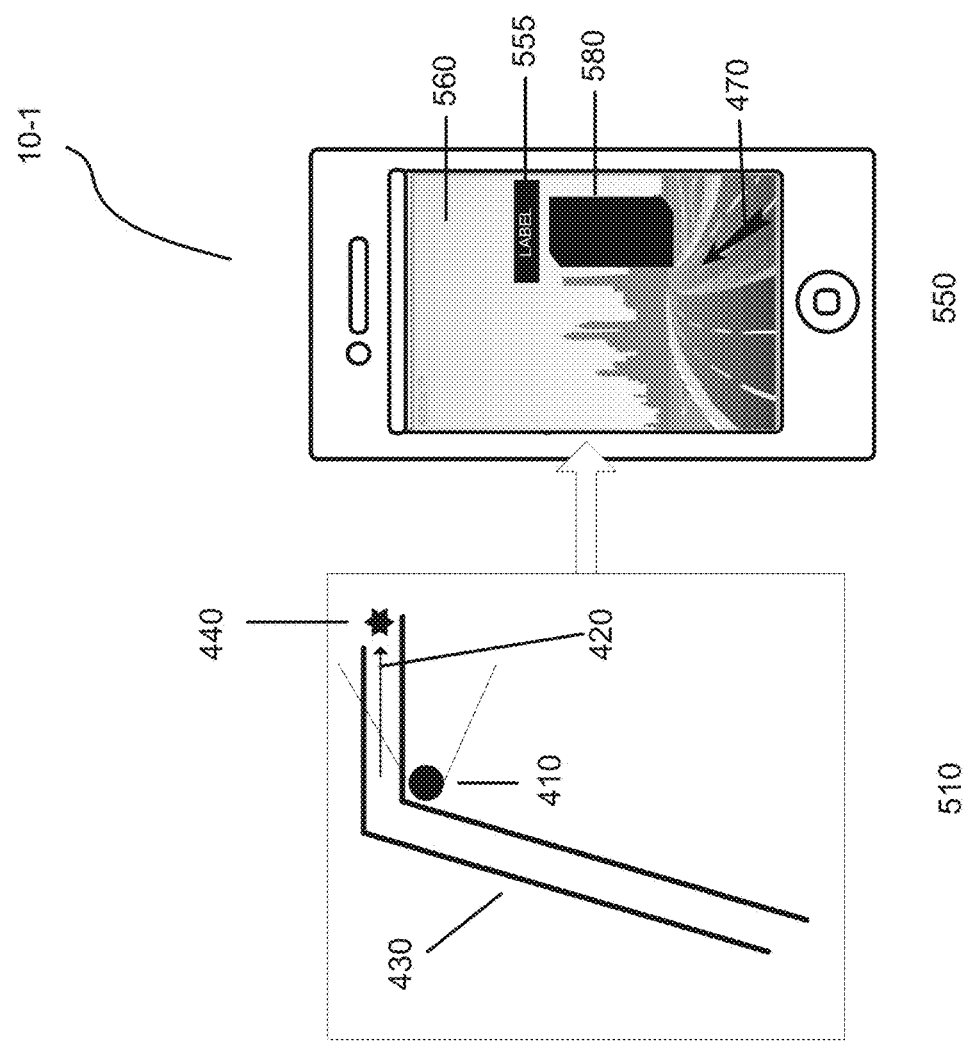
FIG. 5 is a screen shot of a two-dimensional map corresponding to an image having a label superimposed thereon in accordance with some implementations.

At operation 306, the mobile device 10-1 may determine whether the destination is within the view of the display 14. If it is ("Yes" branch of operation 306), then the mobile device 10-1 may determine how to superimpose the label and navigation information on top of the real-time street view. If not, the mobile device 10-1 then returns to get new location and sensor data at the operation 304. In some implementations, the mobile device 10-1 may prompt a message on the display suggesting that the user should rotate in certain directions to bring the destination into the real-time street view. At operation 307, the mobile device then superimposes the label and navigation information on the display. As shown in FIG. 4, a directional indicator 470 may be superimposed on a real-time image showing to the user on the display 14 of the mobile device 10-1. As shown in FIG. 5, the POI information may be superimposed on the image 560 such that the real-time camera-obtained image displayed on the mobile device 10-1 display 14 may appear to have a label 555. The label 555 may have POI information from the POI information database 130 that is used to locate the relative position of the building 580 such that the label appears "stuck to" or tightly associated with the position of the building 580 in the image 560 on the display 14. The POI information may include GPS information, a size of the POI (e.g., height and width), etc., and the mobile device 10-1 may use this information to generate the label 555 to be superimposed on the image 560 at the apparent position of the building 580. In some implementations, the label is associated with a link such that a user selection of the label may bring up additional information associated with the label, e.g., the homepage of the website associated with the building 580. Alternatively, the additional information may include commercial advertisements provided by a business entity operating in the building. For example, if the business entity is a restaurant, the user can click the label to start making an on-line reservation at the restaurant. In some implementations, the remote server 40 opens an API for third-parties to provide information to be added to the POI database, which may be commercial or not. For example, the real estate manager of an apartment building may periodically update the vacancy of the apartments in the building so that a user who is looking for an apartment can point his smartphone's camera at the building and then receives the updated vacancy information in an email message sent to the user's email account registered with the remote server.

If the mobile device 10-1 is moving, e.g., the user of the mobile device is holding the mobile device as a navigation tool, there is a relative movement of the POIs in the real-time street view relative to the mobile device 10-1. In order to achieve the effect of having the labels "stuck to" the POIs (e.g., the building 580 in FIG. 5), the mobile device needs to update the label and navigation information on the display at operation 308. As noted above, the update process may be undertaken by the mobile device 10-1 itself if the remote server 40 has already provided enough label information of objects in the surrounding environment. Alternatively, if it is the remote server that determines the updated label and navigation information, the operation 308 may require an additional communication between the mobile device 10-1 and the remote server 40.

The right side of FIG. 5 shows real-time navigation results 550 with the label 555 superimposed on the camera-obtained real-time image 560 of the building 580 which may be near the user or within view on the display 14. In some implementations, the building may be the user-provided destination 440, and the label may appear over the building 580 when it enters the view of the display 14 in the real-time image 560. The user indicator 410 may move along the road 430 on the two-dimensional navigation map 510 as the user moves, and the arrow 420 may move, as well. The arrow 470 may be similarly superimposed on the image 560, e.g., to show the direction of travel to the destination, e.g., the building 580. In some implementations, the label may not appear on the POI until the mobile device 10-1 is within a predetermined, default, or selected distance of the destination 440, such that a large object at a great distance (e.g., a skyscraper) does not prematurely have a label 555 attached.

The mobile device 10-1 may send inclination information from e.g., a gyroscope built into the mobile device 10-1. The server 40 may determine the pitch motion of the user's device, which may be superimposed on the screen such that the label information may correspond to the same speed of movement in the vertical direction, and vertical translation of the screen image may remains relatively static. In this way, the virtual label 555 may appear to the user to remain with the building 580 on the display 14 as if it were a physical sign, even when the mobile device 10-1 moves relative to the building 580.

In some implementations, the user may select in operation 302 to view POIs at his current location, rather than at a destination. As such, as the user moves the mobile device 10-1 and the real-time image 580 on the display 14 changes, multiple POIs in his immediate area visible on the display 14 may have a label 555 appear attached thereto, even as the user changes his orientation (e.g., turns around) or travels (e.g., walks or rides down a road 430). In some implementations, the POI information database 130 may return information on all POIs within a predetermined, default, or selectable range. In some implementations, even when a destination is selected at operation 302, it may be selected that multiple POIs be labeled long the route to the destination 440, e.g., landmarks, important buildings, gas stations, government properties, building addresses, monuments, alternate routes, etc.

In some implementations, a type of POI may include other mobile devices 10-2, for example, other users of the application, e.g., with permissions set to be viewed or "friends" of the user of the mobile device 10-1. As such, people may have a label 555 as they appear in the display 14, which may, for example, help a user locate other members of a group.

In some implementations, only the GPS coordinate data may be sent from the mobile device 10-1 to the server 40, and the mobile device 10-1 may receive information, for example, of POIs within a predetermined or selected distance, and then use its own sensors to map the information to the displayed image to superimpose the information, e.g., the arrow 470 or label 555, on the image. In some implementations, some or all sensor information may be sent to the to the server 40 from the mobile device 10-1, and the server 40 may provide more detailed data to the mobile device 10-1 such that the information (e.g., labels of the POIs) may be superimposed. In both of these types of implementations, the real-time image may not be sent to the server 40, such that the final superposition is performed by the mobile device 10-1. This reduces the amount of data usage and time required to process the image.

Also, the camera module 13 may not need to focus to the extent typically desired to capture an image for storage. Typically, a lower resolution image is displayed on the screen as a preview, which may be sufficient for the POI information superposition. Embodiments may allow a user to travel down a road or sidewalk and hold the display 14 up with POI information superimposed on the image displayed on the screen and dynamically updated such that it may appear to the user as if the buildings, monuments, streets, and other typically permanent features have labels, e.g., label 555, attached thereto on the screen, or that the road itself has navigation information, e.g., arrow 470, attached thereto.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof. The term "live broadcast" as used herein refers to and encompasses live performances, pre-recorded performances, syndicated programs, and any and all types of media that can be broadcast, streamed, or transmitted over a plurality of platforms.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

It will be apparent to those skilled in the art that various modifications and variations can be made in implementations of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing point of interest (POI) information on a mobile device comprising a non-transitory computer readable medium including a program, a processor, and a computer executable program code, the method comprising:
    initiating capture of a real-time image of at least one object by a camera module of a mobile device;
    receiving user-provided destination information and sending the user-provided destination information and current location of the mobile device to a server, wherein the server is configured to request the mobile device to provide additional navigation information after finding the user-provided destination information within a predefined distance from the current location;
    in response to the request from the server, determining updated current location, speed, orientation, rotation, and inclination information of the mobile device;
    sending the updated current location, speed, orientation, rotation, and inclination information of the mobile device to the server without sending the real-time image, wherein the server is configured to search for POI information associated with the user-provided destination information in accordance with the updated current location, speed, orientation, rotation, and inclination information of the mobile device and return the POI information to the mobile device;
    receiving the POI information from the server, wherein the POI information includes label information associated with the at least one object within the predefined distance from the mobile device and navigation information from the updated current location of the mobile device to the destination, and wherein the POI information is determined in accordance with the updated current location, speed, orientation, rotation, inclination information of the mobile device, and the destination information without reliance upon the real-time image captured by the camera; and
    displaying the POI information, superimposed on the real-time image of the at least one object, on the mobile device, further including displaying the label information on the real-time image next to the at least one object and displaying a directional indicator on the real-time image indicating a navigation path from the updated current location of the mobile device to the destination based on the navigation information.

2. The method of claim 1, further comprising:
    determining the updated current location, speed, orientation, rotation, and inclination information of the mobile device;
    sending the updated current location, speed, orientation, rotation, and inclination information to the server;
    receiving updated POI information from the server, wherein the updated POI information is at least in part based on the updated current location, speed, orientation, rotation, inclination information of the mobile device, and the destination information; and
    updating the previously-superimposed POI information with the updated POI information on the mobile device such that the label information appears attached to the at least one object and the navigation information moves in a direction towards the destination in the real-time image.

3. The method of claim 1, further includes:
    determining the updated current location, speed, orientation, rotation, and inclination information of the mobile device;
    updating the POI information according to the updated current location, speed, orientation, rotation, inclination information, and the destination information; and
    updating the previously-superimposed POI information with the updated POI information on the mobile device such that the label information appears attached to the at least one object and the navigation information moves in a direction towards the destination in the real-time image.

4. The method of claim 1, further comprising:
    detecting a user selection of the label information;
    in response to the user selection of the label information, sending a query to the server, the query including an identity of the at least one object;
    receiving additional information related to the at least one object from the server; and
    in response to the additional information, activating an interactive application on the mobile device.

5. A method for providing navigation information to a mobile device, the method comprising:
    at a server having a processor and memory for storing programs to be executed by the processor:
        receiving current location and user-provided destination information from the mobile device after the mobile device initiates capture of a real-time image of at least one object by a camera module of the mobile device;
        requesting the mobile device to provide additional navigation information after finding the user-provided destination information within a predefined distance from the current location;

receiving updated current location, speed, orientation, rotation, and inclination information of the mobile device from the mobile device without receiving the real-time image;

identifying POI information associated with the user-provided destination information in accordance with the updated current location, speed, orientation, rotation, and inclination information of the mobile device without reliance upon the real-time image captured by the camera, wherein the POI information includes label information associated with at least one object near the mobile device and navigation information from the updated current location of the mobile device to the destination; and returning the POI information to be superimposed on the real-time image of the at least one object captured by the camera of the mobile device, wherein on the mobile device, the label information is displayed on the real-time image next to the at least one object and a directional indicator is displayed on the real-time image indicating a navigation path from the updated current location of the mobile device to the destination based on the navigation information.

6. The method of claim 5, further comprising:

receiving the updated current location, speed, orientation, rotation, and inclination information from the mobile device, wherein the updated current location, speed, orientation, rotation, and inclination information is generated by respective sensors in the mobile device;

determining updated POI information based on the updated current location, speed, orientation, rotation, inclination information of the mobile device, and the destination information; and returning the updated POI information to the mobile device such that the label information appears attached to the at least one object and the navigation information moves in a direction towards the destination in the real-time image.

7. The method of claim 5, further comprising:

receiving a query from the mobile device, wherein the query was generated by a user selection of the label information;

in response to the query, generating a response including additional information related to the at least one object; and returning the response to the mobile device, wherein the response includes instructions for activating an interactive application on the mobile device.

8. A server, comprising:

a processor;

memory; and a plurality of programs stored in the memory, the programs including instructions for:

receiving current location and user-provided destination information from the mobile device after the mobile device initiates capture of a real-time image of at least one object by a camera module of the mobile device;

requesting the mobile device to provide additional navigation information after finding the user-provided destination information within a predefined distance from the current location;

receiving updated current location, speed, orientation, rotation, and inclination information of the mobile device from the mobile device without receiving the real-time image;

identifying POI information associated with the user-provided destination information in accordance with the updated current location, speed, orientation, rotation, and inclination information of the mobile device, without reliance upon the real-time image captured by the camera, wherein the POI information includes label information associated with at least one object near the mobile device and navigation information from the updated current location of the mobile device to the destination; and returning the POI information to be superimposed on the real-time image of the at least one object captured by the camera of the mobile device, wherein on the mobile device, the label information is displayed on the real-time image next to the at least one object and a directional indicator is displayed on the real-time image indicating a navigation path from the updated current location of the mobile device to the destination based on the navigation information.

* * * * *